(No Model.)
W. J. LANE.
DOOR HANGER.
No. 296,584. Patented Apr. 8, 1884.
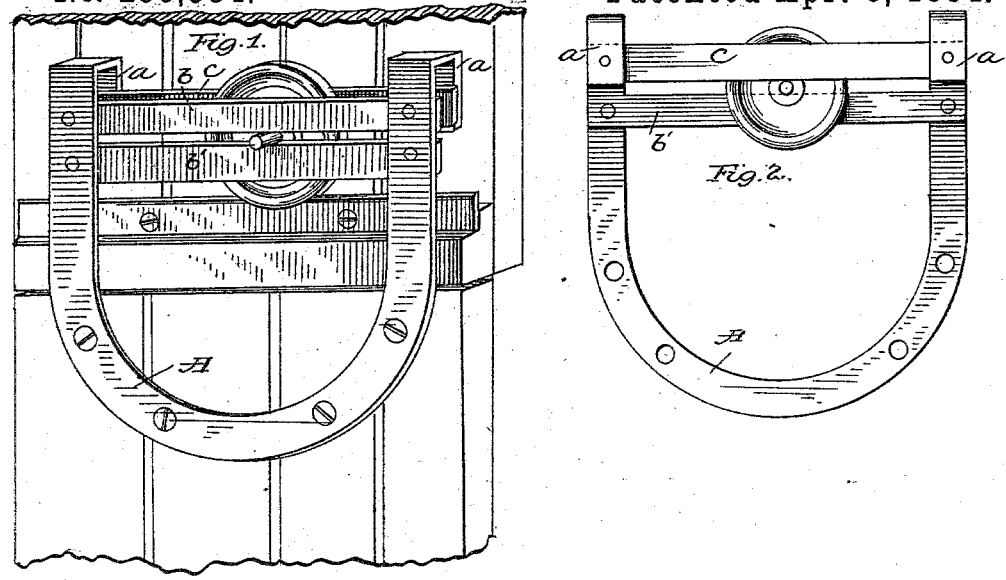
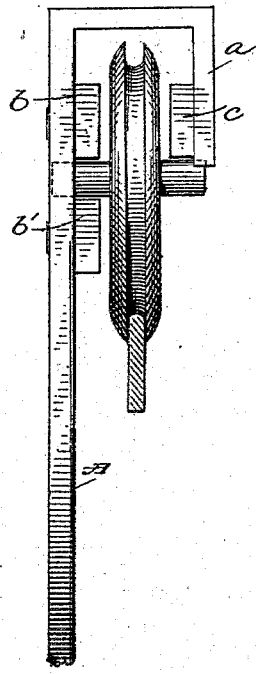
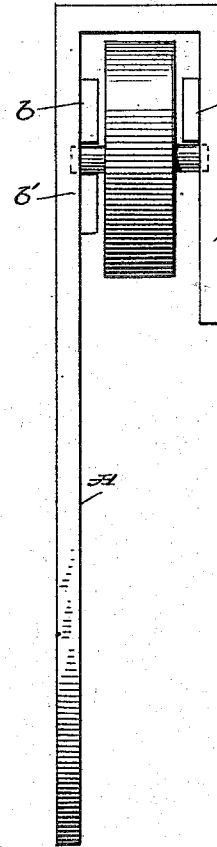
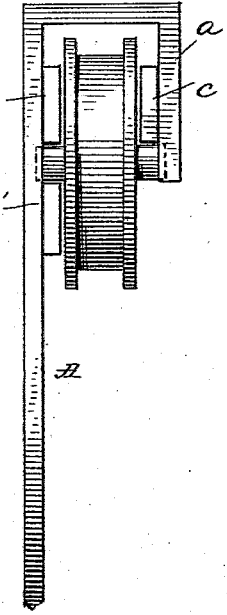
Attest:
James Murray
F. L. Middleton
Inventor
William J. Lane
by Joyce & Spear
Attys.

UNITED STATES PATENT OFFICE.

WILLIAM J. LANE, OF POUGHKEEPSIE, NEW YORK.

DOOR-HANGER.

SPECIFICATION forming part of Letters Patent No. 296,584, dated April 8, 1884.

Application filed January 21, 1884. (No model.)

*To all whom it may concern:*

Be it known that I, WILLIAM J. LANE, of Poughkeepsie, in the county of Dutchess and State of New York, have invented a new and useful Improvement in Door-Hangers; and I do hereby declare that the following is a full, clear, and exact description of the same.

My invention is an improved door-hanger. It consists in substantially the construction hereinafter shown, which construction has been designed to secure combined simplicity and strength.

In the accompanying drawings, Figure 1 shows a front view in perspective; Fig. 2 a back, and Fig. 3 an end view, of the hanger. Fig. 4 shows an end elevation of the hanger with a modification of the wheel. Fig. 5 shows a like elevation of a modified form of wheel and hanger.

The hanger, omitting the wheel, is made of four pieces of flat bar-iron. The frame A, which is bolted or screwed to the door, is curved approximately in the form of a horseshoe, and the ends are bent twice at right angles to form bracket projections for the inner wheel-supporting bar. On the upper ends of the frame A $a\ a$ are riveted two bars, $b\ b'$, with a space between sufficient to admit the steel pin which forms the axle of the supporting-wheel. Directly opposite the upper bar, $b$, and on the downwardly-bent ends of the bracket-arms, is riveted another bar, $c$, and this, with the bar $b$, forms the bearing for the wheel which moves between these two bars and supports them. It is kept in place by the other bar, $b'$.

The wheel may be made of cast-iron. As shown in the form of bracket represented in Figs. 1, 2, and 3, the wheel has a groove adapted to run on the edge of a bar of iron which forms the track. The wheel, however, may be made with a flat tread having a flange on each side, the tread being about seven-eighths of an inch in width, adapting it to run on a track formed of the edge of a board. This is shown in Fig. 4.

Another modification of the form of wheel is shown in Fig. 5, in which the wheel has flat tread without flanges for a wooden track. Within this the bent ends of the bracket-arms $a\ a$ are extended downward a half-inch (more or less) below the lowest part of the wheel, and their extended ends act upon the track as a guide to prevent derailment. It will be understood that the wheel travels along upon the bars as the door moves, the axle rolling under the bars $b\ c$ without friction, and the movement of the wheel is limited by the arms of the frame A.

The general form of the frame A may be changed. Its outline is not material, but the bent ends are a material part of the invention.

I am aware that the supporting-wheel moving under upper bars is old, and upon this point my improvement is confined to the two side bars, between which one end of the axle is confined.

I claim as my invention—

1. A door-hanger consisting of a suitable frame having the bent ends, in combination with the bars $b$ and $c$, and the wheel and axle, substantially as described.

2. In a door-hanger having a suitable frame and the bent ends, the bars $b$, $b'$, and $c$, combined with the wheel and axle, substantially as described.

In testimony whereof I have signed my name to this specification in the presence of two subscribing witnesses.

WILLIAM J. LANE.

Witnesses:
E. M. MEEKE,
F. W. DAVIS.